United States Patent [19]
Casanovas et al.

[11] 4,038,163
[45] July 26, 1977

[54] PROCESS FOR THE TREATMENT BY METALLIC IONS OF AQUEOUS LIQUIDS AND DEVICE FOR MAKING THE SAME

[75] Inventors: Lorenzo Puig Casanovas; Jean Leon Justin Vellas, both of Toulouse, France

[73] Assignee: Societe d'Etudes et de Diffusion de Procedes et Brevets S.A., Geneva, Switzerland

[21] Appl. No.: 586,890

[22] Filed: June 16, 1975

Related U.S. Application Data

[63] Continuation of Ser. No. 84,861, Oct. 28, 1970, abandoned.

[30] Foreign Application Priority Data

Oct. 28, 1969 France .............................. 69.369711

[51] Int. Cl.$^2$ .......................... C02B 1/82; C02C 5/12
[52] U.S. Cl. .................................. 204/152; 204/149; 210/42 R; 210/64
[58] Field of Search ................. 204/149, 152, 130, 96, 204/98; 210/44, 59, 60, 64, 42

[56] References Cited

U.S. PATENT DOCUMENTS

| 937,210 | 10/1909 | Harris | 204/149 |
|---|---|---|---|
| 951,313 | 3/1910 | Hartman | 204/149 |
| 2,658,033 | 11/1953 | Ferris | 204/149 |
| 2,667,454 | 1/1954 | Roller | 204/96 |
| 3,092,566 | 6/1963 | Negus | 204/149 |

OTHER PUBLICATIONS

Dickey, "Filtration", (1961), pp. 25 and 230.
Murphy et al., "College Chemistry", 2nd ed., (1975), pp. 341-345.

*Primary Examiner*—Arthur C. Prescott
*Attorney, Agent, or Firm*—Browdy and Neimark

[57] ABSTRACT

A device for liquid purification includes a vat provided with metallic electrodes and connected to a circulating pump and to a filter containing at least one filtering layer of low granulometry built up from accumulation of floculates. The device is particularly suited for water treatment.

4 Claims, 3 Drawing Figures

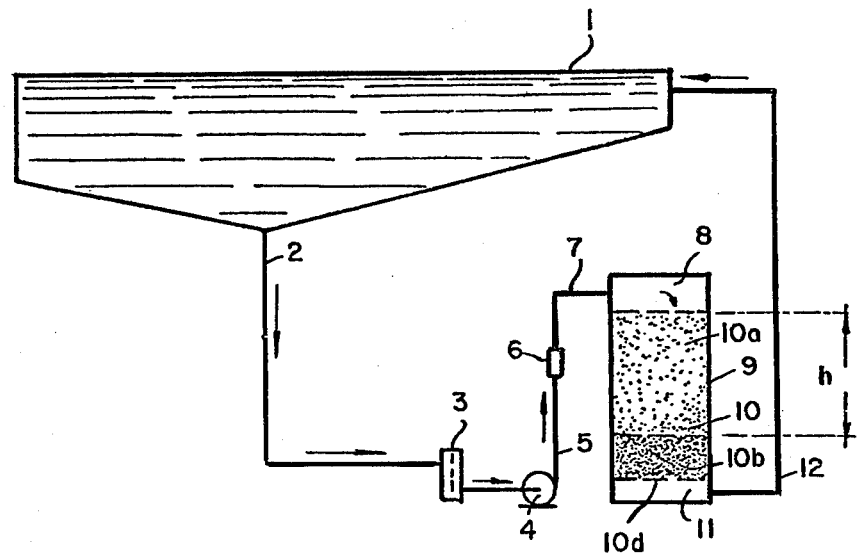
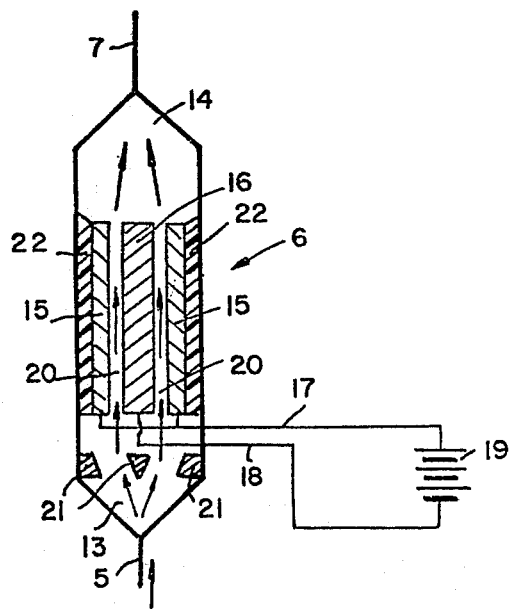
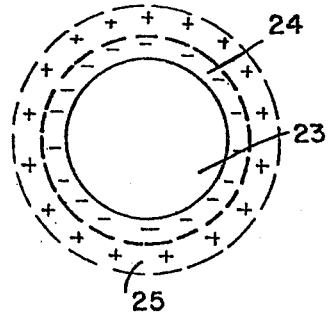

PROCESS FOR THE TREATMENT BY METALLIC IONS OF AQUEOUS LIQUIDS AND DEVICE FOR MAKING THE SAME

This is a continuation, of application Ser. No. 84,861, filed Oct. 28, 1970 now abandoned.

It is well known that in purification of aqueous liquids, and more particularly water, there are two types of undesirable elements which are, on one hand, impurities in suspension and, on the other hand, the dissolved impurities. The impurities in suspension are in the form of precipitates or colloids, and the dissolved impurities are in the ionic state, that is they have extremely small sizes and are electrically charged.

In some purifying processes utilized until now to eliminate these impurities, flocculation processes have been utilized; they consist of introducing a reactant into the liquid to create colloids with adsorption properties, said colloids forming a group then ensuring the flocculation and enclosing simultaneously the impurities in suspension. The flocculation provides large sized particles which can be separated from the liquid, either by decantation or by filtering or a combination of these two processes.

To create said flocculation, metallic salts are utilized, such as aluminium sulphate $Al(SO_4)_2$ or ferrous chloride $FeCl_2$ which are very soluble in water and dissociate giving off their metallic ions; these ions in combination with the hydroxyl ions ($OH^-$) contained in the water form a corresponding metallic hydroxide that shows adsorption and then flocculation properties. The process is similar for all flocculents with chloride, nitrate or sulphate basis which, upon their reaction, give off the corresponding anion that is not useful for the flocculation and which has the disadvantage, when present, to cause an acidification of the liquid considering that this anion always comes from strong acid salts, and consequently the pH of the liquid has to be adjusted to a correct value.

Besides, often the pH of the liquid has to be adjusted to provide flocculation, and especially it is well known that the alumina hydrate coagulates well only when the pH of the solution is lower than 7.4 or higher than 8.5. When ferrous hydroxide is utilized as a coagulant, it is first necessary to adjust the pH to a value higher than 6.

It has also been noticed that when using chemical reactants it is necessary to introduce said reactant in rather large quantities, and at least drop by drop, resulting in a dissociation between the metallic ions and the anions in areas of small active surface. This causes a rapid formation of the hydroxide and an increase thereof in a low volumen. There results consequently a poor adsorption power, and, to properly produce the flocculate requires a stirring of the liquid.

From the invention, all above mentioned disadvantages are eliminated because anions (nitrates, sulphates or chlorides) are not introduced into the liquid to be treated and also because the metallic ions are evenly introduced into the liquid, exactly as if they were introduced one by one, whereby the resulting active surface is considerable for a determined mass of metallic ions introduced into the liquid under treatment.

According to the invention, the process for the electrolytic treatment of an acqueous liquids is characterized in that a scattered emission of metallic ions is produced in the aqueous liquid from metallic electrodes submitted to the action of an electric current, the quantity of which when applied to said electrodes determines the quantity of ions sent out, whereby some of the metallic ions sent out are combined with hydroxyl ions which are in the liquid, thus creating colloidal particles having a high adsorbing power and causing a fine flocculation, and in that the fine flocculate is continuously retained during formation in the form of a porous filtering mass of fine flocculate which, is traversed by the liquid still comprising metallic ions and also in that the quantity of metallic ions which is electrically produced is selected to allow penetration of metallic ions through the porous mass of and drawing away therefrom by the treated liquid, whereby the treated liquid comprises some free metallic ions raising the resulting electrical potential of the treated liquid in comparison with the potential of the liquid before the metallic ions emission.

According to another important characteristic of the invention, the porous mass of flocculate is constituted by impregneating with the nascent flocculate a filtering mass with low granulometry, the flocculate being retained in said filtering mass until the same shows a loss of pressure substantially quadruple of the loss of pressure noticed on beginning of treatment, whereby said filtering mass impregneted with the flocculate forms a self-regulating buffer of the quantity of free metal ions having not caused a flocculation and which are drawn away from said porous mass of flocculate to maintain a high electrical potential of the treated liquid.

From the above mentioned process, very numerous treatments can be made with a rare efficiency. Actually, according to the nature of the constitutive metal of electrodes from which the metallic ions are emitted, the result which is obtained for the liquids, especially water, treated by the process show that said liquids are cleared out of all foreign elements that they contained. Besides they show bactericidal and algicidal properties especially when this metal is copper, deodorant and desalinizing properties when the metal is iron, or some other properties such as a catalytic action allowing the development of yeast when the treatment is applied to distillery liquids, the acidification of which is considerably decreased.

Upon practice of the invention there has also been surprisingly noticed that a very efficient purification of the radioactive waters could be obtained. This constitutes a very important embodiment of the process of the invention.

Other characteristics of the invention are shown in the following detailed description.

Embodiments of the invention are shown by way of non restrictive examples in the accompanying drawing.

FIG. 1 is a diagrammatic view of a close-circuit installation for treatment embodying the process of the invention.

FIG. 2 is a diagrammatic view of a treatment vat illustrating a particular characteristic of the invention.

FIG. 3 is a diagram of a colloidal particle formed from the ionic emission, according to the process of the invention.

With reference to FIG. 1, a vat or tank 1 contains a liquid intended to be treated, for example water to be purified. A conduit 2 brings the waters to a prefilter 3, and a circulating pump 4 is connected through a discharge pipe 5 to a treatment vat 6 containing metallic electrodes supplied with electric current. The outlet of the treatment vat 6 is connected by a part 7 to a upper pipe 8 of a filter 9. The inside of filter 9 is provided with a load 10 of filtering material composed for example of flint and which is arranged in two layers 10a, 10b.

In the case of the treatment of a water, for example swimming-pool water, the layer 10a is composed of granules of about 0.4 mm in diameter and the layer 10b of granules of 1.4 mm in diameter, said layer 10a filling the two thirds of the filter whereas the layer 10b fills only one third. The whole of the filtering mass is installed on a grate 10d to leave an empty space 11 at the filter base. The filtered waters are afterwards brought back into the vat or tank 1 through a pipe 12.

FIG. 2 shows in a diagrammatic way, but in an enlarged view, how the treatment vat 6 may be constituted. This treatment vat has an inlet cavity 13 connected to the pipe 5 and an outlet cavity 14 connected to the pipe 7. Between said two cavities 13 and 14 are placed in an alternate way, metallic electrodes 15 and 16 respectively connected to conductors 17 and 18 leading to a electric supply source 19 which can be either direct or alternating, or only pulsed as it is generally preferred. It is thus possible to utilize a current directly supplied from an alternating mains of which the voltage is lowered to about ten volts, the current is then rectified whereby alternances of a same polarity are applied to each of the electrodes, then the connection between the source terminals and the electrodes may be cyclically reversed in order to depolarize the electrodes after a certain period of operation.

In the example represented, only three electrodes are shown but it is obvious that any number of electrodes can be utilized.

To obtain a correct working of the invention, it it important that the release of metallic ions be very uniform. For this purpose, uniform liquid circulation between the electrodes of opposite polarity is provided. To obtain this result, a first means consists of controlling the shape of the inlet cavity 13 and outlet cavity 14 in order that the liquid be distributed equally into the channels 20 which are delimited between the electrodes. Several mechanical means can be considered to obtain this result, for instance the inlet and outlet walls of the treatment vat can be substantially shaped in the form of a parabola or a frusto-conical surface end besides, deflector elements 21 can be provided at least above channels 20 whereby the flow of liquid in these channels be the same.

In addition and still for obtaining an uniform treatment, and this is especially important in critical treatments requiring a complete embodiment of the invention, for example when radioactive waters are to be treated, the far end electrodes, which are the electrodes 15 in the represented example, are connected to the walls of the vat 6 by filling elements 22 preventing the liquid from flowing between said electrodes and walls, since the liquid which would flow through this way would not be treated in the same manner as the one flowing between the two electrodes of opposite polarities.

With the above described means and especially with the particular fitting of the treatment vat 6, the liquid circulating between electrodes 15 and 16 is charged with metallic ions. It has been determined that said ions form hydroxides, in the presence of the hydroxyl ions of the solution, for example copper hydroxides if the electrodes are made of copper. As schematically shown in FIG. 3, these copper hydroxides, of a $Cu(OH)_2$ formula, form a primary particle 23 which is surrounded by a first layer 24 formed of adsorbed ions, then by a second layer 25 formed of ions electrostatically attracted, this complex particle corresponding to a colloidal status.

The potential difference existing between the outer side of the primary particle 23 and the first layer of the solution is called "Nerst potential" while the potential difference existing between the first and the second layer is called "Stern potential". The electro-kinetic potential of the colloidal particle is the difference of potential existing between the outer side of the second layer 25 and the liquid in which is maintained the colloidal particle. Said potential can be measured and the value thereof is determined by the Choluchowski equation, that is:

electro-kinetic potential = $(a \pi \eta \mu / H D)$ in which $\eta$ is the liquid viscosity, $\mu$ the migration speed of the colloidal particle, H the potential gradient and D a dielectric constant. The electrokinetic potential then defines the possibility of flocculation.

Since the colloidal particles are at the electrokinetic potential, electric forces of repulsion exist therebetween because these particles are electrically charged and of the same sign, but there also exist mechanical forces of attraction which are known under the name of Van der Waals forces which vary inversely with the seventh power of the distance separating the particles.

Because of both the repulsion forces existing due to electrical charges of colloidal particles created from the ionic emission from the electrodes and the Van der Waals attraction forces, it is obvious that it is the resultant of these two forces which determines the possibility for two particles to meet, coagulate and then to flocculate.

Since there is in the liquid to be treated an homogeneous distribution of the released ions obtained upon the embodiment of the invention the emission of metallic ions is made possible from all the surface of the electrodes, then for a determined mass of metal extracted from each anode, the active surface of the particles is considerable and out of proportion with the surface obtained from a metallic salt.

It can be calculated that the particles which are created from the ionic emission are in the range of 0.5 $\mu$ to 1m $\mu$ and consequently they represent a considerable surface-mass ratio since the calculation shows also that one $cm^3$ of particle divided into cubes of 1 $m\mu$ per side, would show an active surface of 6000 $m^2$.

For the reasons explained above and the great dispersion of the colloidal particles formed from ions emitted in the liquid, the formation of flocculate is fine and scattered. The result thereof is that the flocculates under formation have themselves great adsorption properties.

Because of the fine and scattered formation thereof, flocculate penetrates into the filtering layer 10a of the filter and progressively, in the course of the treatment embodiment, saturates the whole depth h of the filtering mass at low granulometry, this low granulometry being preferred because of the small size of the flocculates formed, whereby the filter is filled with a porous mass of flocculate so that the liquid added with flocculate while going through the porous mass progressively cooperates to its formation.

When put into practice and for a filter presenting upon beginning of utilization a loss of pressure of 0.5 bar, the flocculate impregnating the filter is left to develop until the loss of pressure in the filter has reached from 1.5 to 2 bars. Then the filtering mass 10 is washed to remove the flocculate in excess and the treatment starts again in the same way.

As it appears from above, by embodying the process of the invention, the totality of the filtering mass is used as a filter since this whole mass is progressively saturated by the fine flocculate, contrarily to what occurs when the filters are utilized to retain flocculates formed by known methods. In that latter case, the filter constitutes a barrier on the top of which a cake of floccate is formed without penetrating into the filtering material which has not, then an active action regarding the purification process.

If desired, the filter 9 can be replaced by a decanter but of course in that case the circulating speed of the liquid must be considerably decreased in order that the flocculate which is retained in the decater and which has to be saturated by the liquid under treatment will develop as a group of thick flocculates which must not be carried away. This process is therefore sometimes advantageous for the treatment of very large quantities of water and also when combined to a subsequent filtering in a filter of the type of the one described above because then the fine flocculates of the decanter can advantageously be carried to the filter to ensure the saturation and consequently the activity thereof.

The quantity of active residual ions which remains in the liquid after running through the filter is an important feature of the present invention and said active residual ions are more often desired in the treatment process because they provide a raise in the potential of the treated liquid. As an example a water added with copper of 90 gamma or thousandths of milligrams/liter has a voltage raised from 60 to 120 millivolts, which considerably causes favorable complementary treatment effects, especially microbicidal and algicidal effects. That is explained by the fact that the metallic ions, especially the ions of copper and silver, gold, platinum, etc., show avidity towards proteinic substances of bacteria, various germs and virus: the change in electrical potential of the medium resulting from the presence of ions, acts moreover as a depressive agent of the superficial voltage which in some cases causes the bursting or the degeneration of microbial cells.

As already mentioned above, the process of the invention presents a very particular activity when embodied for the decontamination of radio-active water. In fact it has been checked that practically all the radio-active isotopes, contained in contaminated waters, were retained. It has been especially checked for the following elements.

| Elements | Retention (%) |
|---|---|
| Caesium 137 | 100 |
| Calcium 45 | 78 |
| Strontium 90 | 65 |
| Yttrium 90 | 90 |
| Zirconium 95 | 100 |
| Niobium 95 | |
| Iodine 131 | 75 |
| Cerium | 100 |
| Praseodymium 144 | |
| Uranium 233 | 100 |
| Cobalt 60 | 100 |
| Ruthenium | 100 |
| Rhodium | |

The invention is not restricted to the embodiments shown and described in detail, for various modifications thereof can moreover be applied to it without departing from the scope of the invention. In particular, though the invention has been described with reference to water treatment, in close circuit, from a vat, it is obvious that it can be embodied, in a similar way, for a treatment in open circuit, the treated water could be rendered drinkable for human consumption or regenerated for an industrial treatment or only treated and returned to the river.

We claim:

1. A process for purifying an aqueous liquid containing impurities, comprising the steps of:

passing the aqueous liquid in a uniformly distributed manner between electrodes formed of a single metal the ions of which are capable of effecting both the formation of fine flocculates of impurities and sterilization, continuously subjecting said electrodes to an electric current to effect uniformly scattered emission of monometallic ions through the aqueous liquid thus causing the formation of fine flocculates of the impurities in the aqueous liquid, retaining the fine flocculates in the form of a porous mass, continuing to circulate aqueous liquid through said porous mass whereby further flocculated impurities contained therein are deposited and retained in said porous mass to increase the volume thereof;

applying sufficient current to said electrodes to provide said monometallic ions emission at a rate such that a number of free ions sufficient to provide an algicidal or biocidal effect, of the metal of said electrodes, pass through the porous mass with the aqueous liquid, and washing the porous mass of flocculates upon reaching a determined threshold of pressure drop for the aqueous liquid passing through said porous mass, whereby said aqueous liquid is epurated by action of flocculates continuously energized by the emission of said monometallic ions, additional ions of said metal of said electrodes going through said porous mass further providing sterilization properties to said epurated aqueous liquid.

2. The process in accordance with claim 1 wherein the flocculates retained as a porous mass are retained in a preformed filtering mass whereby the aqueous liquid circulated through the filtering mass is brought into contact with a great surface of filtering material covered by said flocculates.

3. The process in accordance with claim 1 further comprising providing a filtering mass, measuring a first pressure drop of said aqueous liquid passing through said filtering mass at the beginning of said process, effecting said retention of flocculates in the filtering mass, and carrying out said washing of said filtering mass when said pressure drop rises to substantially four times said first pressure drop.

4. A process for electrolytically treating water in a swimming pool, comprising the steps of:

pumping water from said swimming pool, circulating said water in a uniformly distributed manner between electrodes formed of a single metal the ions of which are capable of sterilization and of forming fine flocculate, continuously subjecting said electrodes to an adjustable current thus causing a very uniform emission of metal ions from said electrodes through said water and initiation of fine flocculates, passing said water and initiated fine flocculates through a filtering mass and progressively covering the filter mass material on the whole of its surface with said fine flocculates thereby progressively increasing the volume of the filter, selecting the current applied to the electrodes to provide said uniform emission of metal ions from said electrodes at a rate such that a number of free metal ions sufficient to provide a rise in resistivity of the filtered water and to provide a sterilization effect, pass from such electrodes through the filtering mass, bringing back the water containing said free metal ions from the filtering mass to the swimming pool, measuring pressure drop of said water going through the filtering mass at the beginning of said process and during continuation thereof, and washing said filtering mass when said pressure reaches a determined threshold.

* * * * *

UNITED STATES PATENT AND TRADEMARK OFFICE
CERTIFICATE OF CORRECTION

PATENT NO. : 4,038,163
DATED : July 26, 1977
INVENTOR(S) : Lorenzo Puig Casanovas et al.

It is certified that error appears in the above-identified patent and that said Letters Patent are hereby corrected as shown below:

Column 1, line 64, "acqueous" should read --aqueous--

Column 2, line 7, delete "," after "which"

Column 4, line 60, after "is" insert --progressively--

Signed and Sealed this

Sixth Day of December 1977

[SEAL]

Attest:

RUTH C. MASON
Attesting Officer

LUTRELLE F. PARKER
Acting Commissioner of Patents and Trademarks